(12) United States Patent
Christopherson et al.

(10) Patent No.: US 10,787,879 B2
(45) Date of Patent: *Sep. 29, 2020

(54) FRACTURING FLUID DELIVERY SYSTEM

(71) Applicant: Cameron International Corporation, Houston, TX (US)

(72) Inventors: Adam J. Christopherson, Houston, TX (US); Jay P. Painter, League City, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,084

(22) Filed: Jun. 17, 2019

(65) Prior Publication Data
US 2020/0141205 A1 May 7, 2020

Related U.S. Application Data

(63) Continuation of application No. 14/940,346, filed on Nov. 13, 2015, now Pat. No. 10,323,475.

(51) Int. Cl.
| | |
|---|---|
| *E21B 33/068* | (2006.01) |
| *E21B 34/02* | (2006.01) |
| *E21B 43/26* | (2006.01) |
| *F16L 55/00* | (2006.01) |
| *F16L 27/08* | (2006.01) |

(52) U.S. Cl.
CPC ............ *E21B 33/068* (2013.01); *E21B 34/02* (2013.01); *E21B 43/26* (2013.01); *F16L 55/00* (2013.01); *F16L 27/0861* (2013.01)

(58) Field of Classification Search
CPC ...... E21B 33/068; E21B 33/076; E21B 34/02; E21B 43/26; F16L 55/00
See application file for complete search history.

(56) References Cited

U.S. PATENT DOCUMENTS

| | | | |
|---|---|---|---|
| 1,615,536 | A | 1/1927 | Del Mar |
| 2,753,940 | A | 7/1956 | Bonner |
| 3,233,668 | A | 2/1966 | Hamilton et al. |

(Continued)

FOREIGN PATENT DOCUMENTS

| | | |
|---|---|---|
| CA | 2178856 A1 | 12/1997 |
| CA | 2654848 A1 | 8/2010 |
| WO | 2009154881 A1 | 12/2009 |

OTHER PUBLICATIONS

Perry's Chemical Engineers' Handbook, 6th ed., Robert H. Perry and Don Green (eds.), 1984, cover, title page, copyright page, and pp. 6-1, 6-41, 6-45, 6-46, 6-54, and 6-55, McGraw-Hill Inc., New York, United States of America.

(Continued)

*Primary Examiner* — Matthew R Buck
(74) *Attorney, Agent, or Firm* — Eubanks PLLC

(57) ABSTRACT

A fracturing fluid delivery system is provided. In one embodiment, the system includes wellhead assemblies, a fracturing manifold trunk line, vertical branches extending upward from the fracturing manifold trunk line, and fluid conduits coupling the vertical branches in fluid communication with the wellhead assemblies. The fluid conduits may extend linearly from the vertical branches to the wellhead assemblies. Additional systems, devices, and methods are also disclosed.

20 Claims, 9 Drawing Sheets

(56) References Cited

U.S. PATENT DOCUMENTS

| | | | |
|---|---|---|---|
| 3,993,100 A | | 11/1976 | Pollard et al. |
| 4,355,961 A | | 10/1982 | Riggs |
| 4,366,864 A | | 1/1983 | Gibson et al. |
| 4,452,312 A | * | 6/1984 | Roblin ................. E21B 43/017 166/339 |
| 4,559,716 A | * | 12/1985 | Daughtry ................ E21B 41/10 33/529 |
| 4,570,673 A | * | 2/1986 | Kendrick ................ E21B 21/02 137/615 |
| 4,603,887 A | * | 8/1986 | Mayfield ............. F16L 27/1275 285/32 |
| 4,632,432 A | * | 12/1986 | Reneau ................. E21B 43/013 285/24 |
| 4,767,136 A | * | 8/1988 | Lehmann ................ F16L 37/26 285/32 |
| 4,821,564 A | | 4/1989 | Pearson et al. |
| 4,828,033 A | | 5/1989 | Frison |
| 4,998,756 A | * | 3/1991 | Hart ................... F16L 27/1274 285/298 |
| 5,195,589 A | * | 3/1993 | Mota ..................... F16L 37/002 166/341 |
| 5,244,045 A | * | 9/1993 | Mota ..................... E21B 43/013 166/341 |
| 5,421,408 A | | 6/1995 | Stoisits et al. |
| 5,803,506 A | | 9/1998 | Argersinger et al. |
| 6,003,604 A | * | 12/1999 | Wilkins ................ F16L 27/053 166/338 |
| 6,234,030 B1 | | 5/2001 | Butler |
| 6,364,024 B1 | | 4/2002 | Dallas |
| 6,893,558 B1 | | 5/2005 | McGee et al. |
| 7,841,394 B2 | | 11/2010 | McNeel et al. |
| 8,398,122 B2 | | 3/2013 | Crompton et al. |
| 8,474,521 B2 | | 7/2013 | Kajaria et al. |
| 8,839,867 B2 | | 9/2014 | Conrad |
| 8,905,056 B2 | | 12/2014 | Kendrick |
| 8,978,763 B2 | | 3/2015 | Guidry |
| 9,068,450 B2 | | 6/2015 | Guidry |
| 9,127,545 B2 | | 9/2015 | Kajaria et al. |
| 9,222,345 B2 | | 12/2015 | Conrad |
| 9,255,469 B2 | | 2/2016 | Conrad |
| 9,518,430 B2 | | 12/2016 | Guidry |
| 9,631,469 B2 | | 4/2017 | Guidry et al. |
| 9,903,190 B2 | | 2/2018 | Conrad et al. |
| 9,915,132 B2 | | 3/2018 | Conrad |
| 9,932,800 B2 | | 4/2018 | Guidry |
| 10,094,195 B2 | | 10/2018 | Guidry |
| 10,132,146 B2 | | 11/2018 | Guidry |
| 10,323,475 B2 | * | 6/2019 | Christopherson ..... E21B 33/068 |
| 10,385,643 B2 | | 8/2019 | Guidry |
| 10,385,645 B2 | | 8/2019 | Guidry |
| 10,385,662 B2 | | 8/2019 | Conrad |
| 10,487,637 B2 | | 11/2019 | Guidry et al. |
| 2003/0205378 A1 | | 11/2003 | Wellington et al. |
| 2003/0205385 A1 | | 11/2003 | Duhn et al. |
| 2004/0251020 A1 | | 12/2004 | Smith |
| 2006/0207763 A1 | | 9/2006 | Hofman |
| 2007/0125544 A1 | | 6/2007 | Robinson et al. |
| 2007/0227722 A1 | | 10/2007 | Atencio |
| 2008/0277120 A1 | | 11/2008 | Hickie |
| 2009/0114392 A1 | | 5/2009 | Tolman et al. |
| 2009/0194273 A1 | | 8/2009 | Surjaatmadja et al. |
| 2009/0261575 A1 | | 10/2009 | Bull et al. |
| 2010/0025034 A1 | | 2/2010 | Donald et al. |
| 2010/0032031 A1 | | 2/2010 | Neal |
| 2010/0051261 A1 | | 3/2010 | Koleilat et al. |
| 2010/0154894 A1 | | 6/2010 | Kotapish et al. |
| 2010/0263872 A1 | | 10/2010 | Bull et al. |
| 2010/0300672 A1 | | 12/2010 | Childress et al. |
| 2011/0011599 A1 | | 1/2011 | Nguyen et al. |
| 2011/0030963 A1 | | 2/2011 | Demong et al. |
| 2011/0048695 A1 | | 3/2011 | Cherewyk et al. |
| 2011/0048698 A1 | | 3/2011 | McGuire et al. |
| 2011/0108275 A1 | | 5/2011 | Borak et al. |
| 2011/0114320 A1 | | 5/2011 | Sponchia et al. |
| 2011/0132596 A1 | | 6/2011 | Yeh et al. |
| 2011/0259584 A1 | | 10/2011 | Broussard, II |
| 2012/0152564 A1 | | 6/2012 | Peltier |
| 2012/0181015 A1 | | 7/2012 | Kajaria et al. |
| 2012/0181016 A1 | | 7/2012 | Kajaria et al. |
| 2012/0181030 A1 | | 7/2012 | Kajaria et al. |
| 2012/0181785 A1 | | 7/2012 | Kajaria et al. |
| 2012/0242081 A1 | * | 9/2012 | Keays ................... F16L 27/053 285/145.3 |
| 2013/0032328 A1 | | 2/2013 | Guidry et al. |
| 2013/0175039 A1 | * | 7/2013 | Guidry ................... E21B 17/05 166/308.1 |
| 2014/0238683 A1 | | 8/2014 | Korach et al. |
| 2014/0246211 A1 | * | 9/2014 | Guidry ............. F16L 27/12751 166/379 |
| 2015/0159458 A1 | | 6/2015 | Tan et al. |
| 2015/0275629 A1 | * | 10/2015 | Hatton ................... F16L 27/12 285/298 |
| 2015/0354313 A1 | | 12/2015 | McClinton et al. |
| 2018/0187662 A1 | | 7/2018 | Hill et al. |
| 2018/0291718 A1 | | 10/2018 | Conrad et al. |
| 2019/0383125 A1 | | 12/2019 | Koricanek |

OTHER PUBLICATIONS

API Specification 6A: Specification for Wellhead and Christmas Tree Equipment, 17th ed., 1999, American Petroleum Institute, United States of America.

API Specification 6A: Specification for Wellhead and Christmas Tree Equipment, 19th ed., 2004, American Petroleum Institute, United States of America.

Catalog for Pressure Control Equipment, Feb. 1, 2005, Woodco USA, Houston, Texas, United States of America.

Bommer, Paul, A Primer of Oilwell Drilling, 7th ed., 2008, cover, title page, copyright page, and pp. 177, 213, and 234, The University of Texas at Austin, United States of America.

Slayden, Bruce, et al., *Cameron International Corporation v. Nitro Fluids L.L.C.*, United States District Court for the Southern District of Texas, Case No. 4:18-cv-02533, Complaint filed Jul. 20, 2018.

Hall, James, et al., *Nitro Fluids, L.L.C. v. Cameron International Corporation*, Case IPR2019-00804, U.S. Pat. No. 9,903,190, Petition for Inter Partes Review filed Mar. 8, 2019.

Hall, James, et al., *Nitro Fluids, L.L.C. v. Cameron International Corporation*, Case IPR2019-00852, U.S. Pat. No. 9,932,800, Petition for Inter Partes Review filed Mar. 20, 2019.

Guidry, U.S. Appl. No. 16/542,955, filed Aug. 16, 2019.

Conrad, U.S. Appl. No. 16/542,984, filed Aug. 16, 2019.

Keville, John, et al., *Cameron International Corporation v. Butch's Rathole & Anchor Service, Inc.*, United States District Court for the Western District of Texas, Case No. 6:20-cv-00124, Complaint filed Feb. 17, 2020.

Keville, John, et al., *Cameron International Corporation v. Nitro Fluids L.L.C.*, United States District Court for the Western District of Texas, Case No. 6:20-cv-00125, Complaint filed Feb. 17, 2020.

Hall, James, et al., *Nitro Fluids, L.L.C. v. Cameron International Corporation*, Case IPR2020-00691, U.S. Pat. No. 10,094,195, Petition for Inter Partes Review filed Mar. 9, 2020.

Demong, Karl, et al., "Shale Energy: Developing the Horn River-Re-engineering surface equipment and processes to support continuous fracing", World Oil, Oct. 2010, vol. 231, No. 10, Gulf Publishing Company, Houston, Texas, United States of America.

Power Chokes, L.P., Engineering Drawings dated 2003-2004 (3 pages).

* cited by examiner

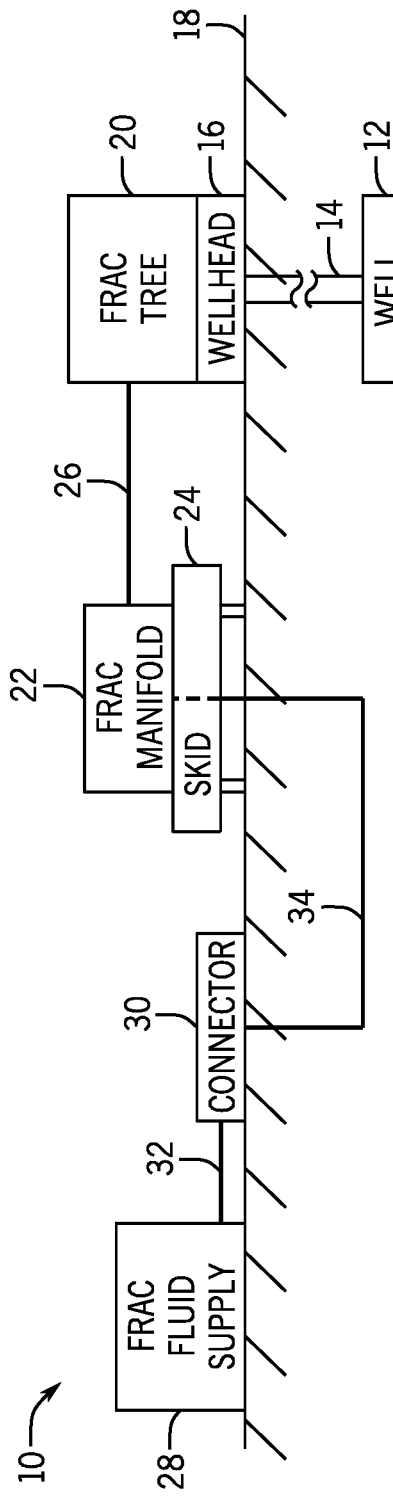
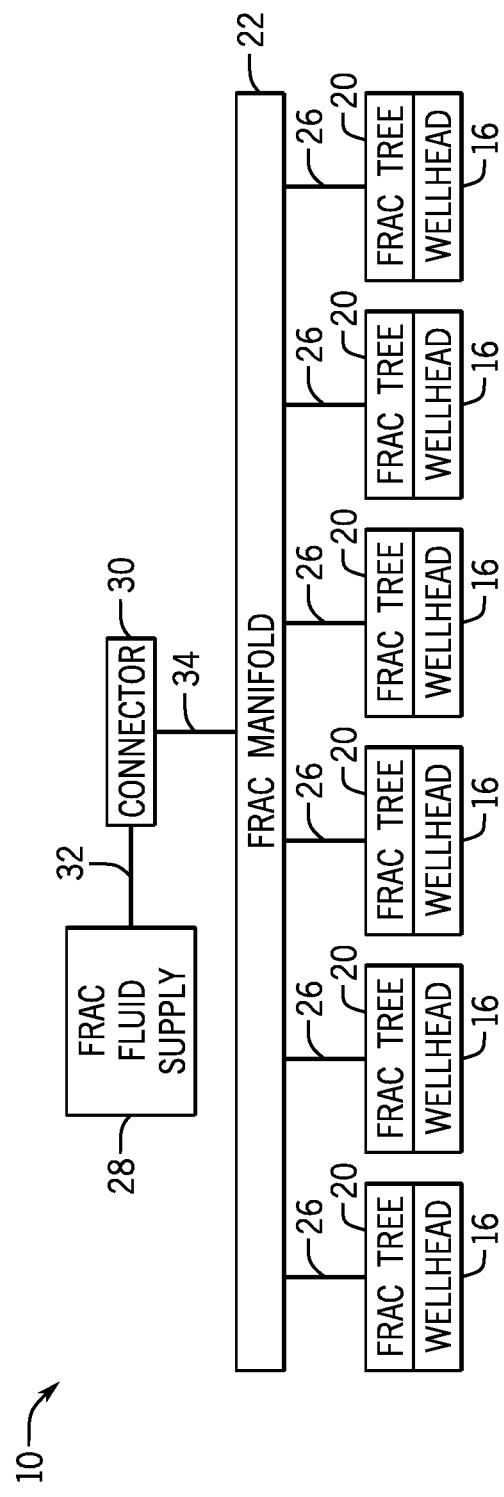

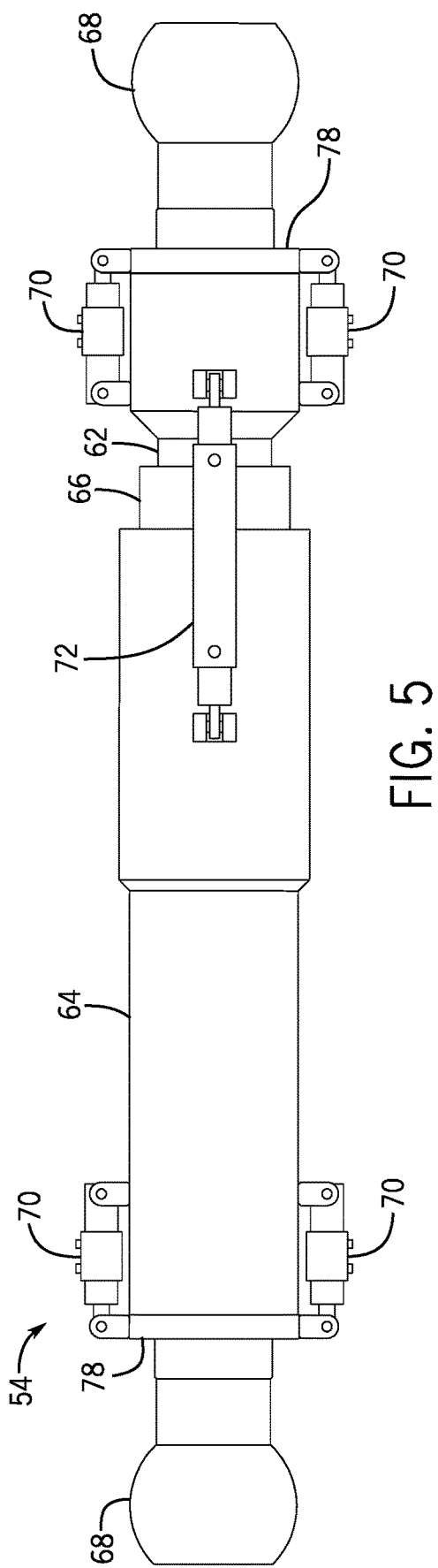
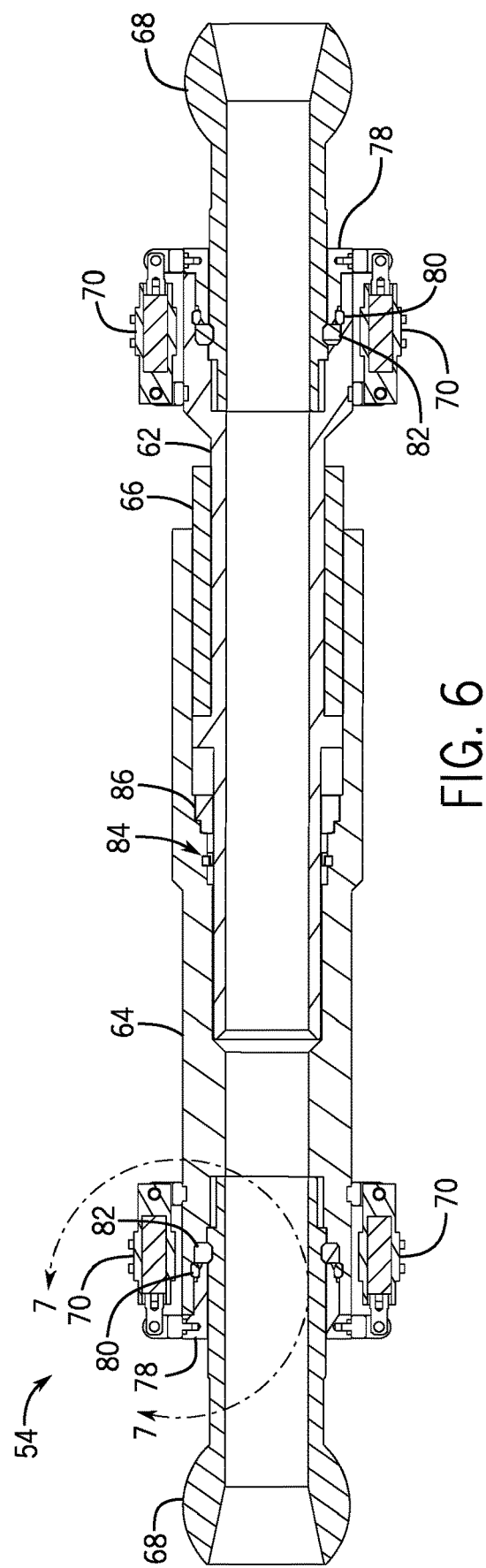

FRACTURING FLUID DELIVERY SYSTEM

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

Additionally, such wellhead assemblies may use a fracturing tree and other components to facilitate a fracturing process and enhance production from a well. As will be appreciated, resources such as oil and natural gas are generally extracted from fissures or other cavities formed in various subterranean rock formations or strata. To facilitate extraction of such resources, a well may be subjected to a fracturing process that creates one or more man-made fractures in a rock formation. This facilitates, for example, coupling of pre-existing fissures and cavities, allowing oil, gas, or the like to flow into the wellbore. Such fracturing processes typically include injecting a fracturing fluid— which is often a mixture including sand and water—into the well to increase the well's pressure and form the man-made fractures. A fracturing manifold may provide fracturing fluid to one or more fracturing trees via fracturing lines (e.g., pipes). But the fracturing manifolds and associated fracturing tress are typically large and heavy, and may be mounted to other equipment at a fixed location, making adjustments between the fracturing manifold and a fracturing tree difficult.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to fracturing fluid delivery systems having fracturing manifolds connected to provide fracturing fluid to wellhead assemblies. In one embodiment, a fracturing manifold trunk line is coupled to wellhead assemblies through vertical branches, extending upward from the trunk line, and fluid conduits between the vertical branches and the wellhead assemblies. In some embodiments, linearly adjustable fluid conduits or pivots are used to facilitate coupling of the trunk line to the wellhead assemblies. The vertical branches can include valves for controlling fracturing fluid flow from the trunk line to the wellhead assemblies.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 1 generally depicts an adjustable fracturing system in accordance with an embodiment of the present disclosure;

FIG. 2 is a diagram of the adjustable fracturing system of FIG. 1 with a fracturing manifold coupled to multiple fracturing trees in accordance with one embodiment;

FIGS. 5 and 6 are a side elevational view and a vertical cross-section of a linearly adjustable fluid conduit of the fluid connector of FIGS. 3 and 4 in accordance with one embodiment;

DETAILED DESCRIPTION OF SPECIFIC EMBODIMENTS

Figure 3:
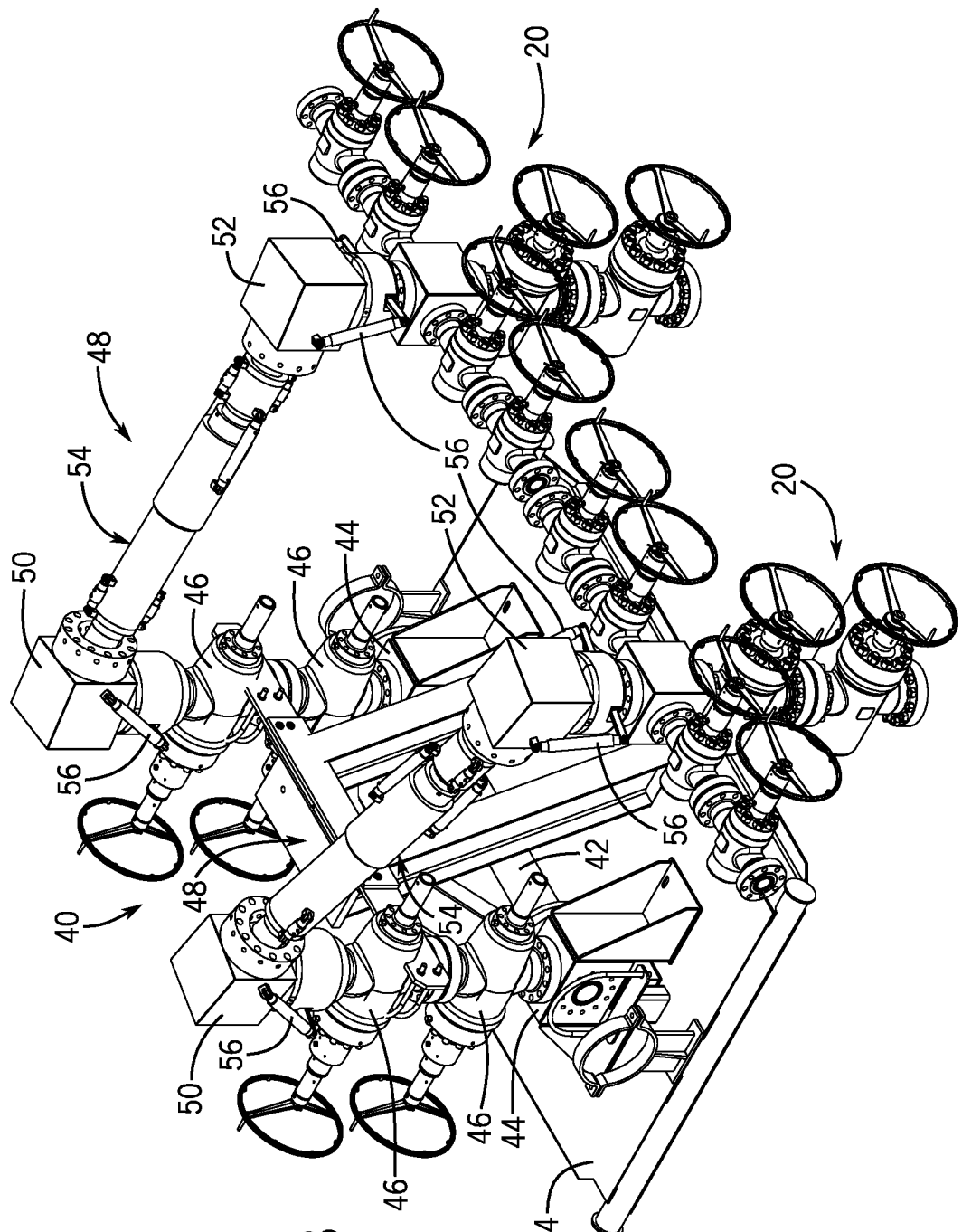
FIG. 3 is a perspective view of certain components of an adjustable fracturing system, including a portion of the fracturing manifold mounted on a skid and joined to fracturing trees with adjustable fluid connectors, in accordance with an embodiment of the present disclosure.

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Turning now to the present figures, an example of a fracturing system 10 is provided in FIGS. 1 and 2 in accordance with one embodiment. The fracturing system 10 facilitates extraction of natural resources (e.g., oil or natural gas) from a well 12 via a wellbore 14 and a wellhead 16. Particularly, by injecting a fracturing fluid into the well 12, the fracturing system 10 increases the number or size of fractures in a rock formation or strata to enhance recovery of natural resources present in the formation. In the presently illustrated embodiment, the well 12 is a surface well accessed by equipment of wellhead 16 installed at surface level (i.e., on ground 18). But it will be appreciated that natural resources may be extracted from other wells, such as platform or subsea wells.

The fracturing system 10 includes various components to control flow of a fracturing fluid into the well 12. For instance, the depicted fracturing system 10 includes a fracturing tree 20 and a fracturing manifold 22. The fracturing tree 20 includes at least one valve that controls flow of the fracturing fluid into the wellhead 16 and, subsequently, into the well 12. Similarly, the fracturing manifold 22 includes at least one valve that controls flow of the fracturing fluid to the fracturing tree 20 by a conduit or fluid connection 26 (e.g., pipes).

The fracturing manifold 22 is mounted on at least one skid 24 (e.g., a platform mounted on rails) to enable movement of the fracturing manifold 22 with respect to the ground 18. As depicted in FIG. 2, the fracturing manifold 22 is connected to provide fracturing fluid to multiple fracturing trees 20 and wellheads 16. But it is noted that the fracturing manifold 22 may instead be coupled to a single fracturing tree 20 in full accordance with the present techniques. In one embodiment in which the fracturing manifold 22 is coupled to multiple fracturing trees 20, various valves of the fracturing manifold 22 may be mounted on separate skids 24 to enable variation in the spacing between the valves.

Fracturing fluid from a supply 28 is provided to the fracturing manifold 22. In FIG. 1, a connector 30 receives fracturing fluid from the supply 28 through a conduit or fluid connection 32 (e.g., pipes or hoses) and then transmits the fluid to the fracturing manifold 22 by way of a subterranean conduit or fluid connection 34 (e.g., pipes). In one embodiment, the fracturing fluid supply 28 is provided by one or more trucks that deliver the fracturing fluid, connect to the connector 30, and pump the fluid into the fracturing manifold 22 via the connector 30 and connections 32 and 34. In another embodiment, the fracturing fluid supply 28 is in the form of a reservoir from which fluid may be pumped into the fracturing manifold 22. But any other suitable sources of fracturing fluid and manners for transmitting such fluid to the fracturing manifold may instead be used.

Figure 4:
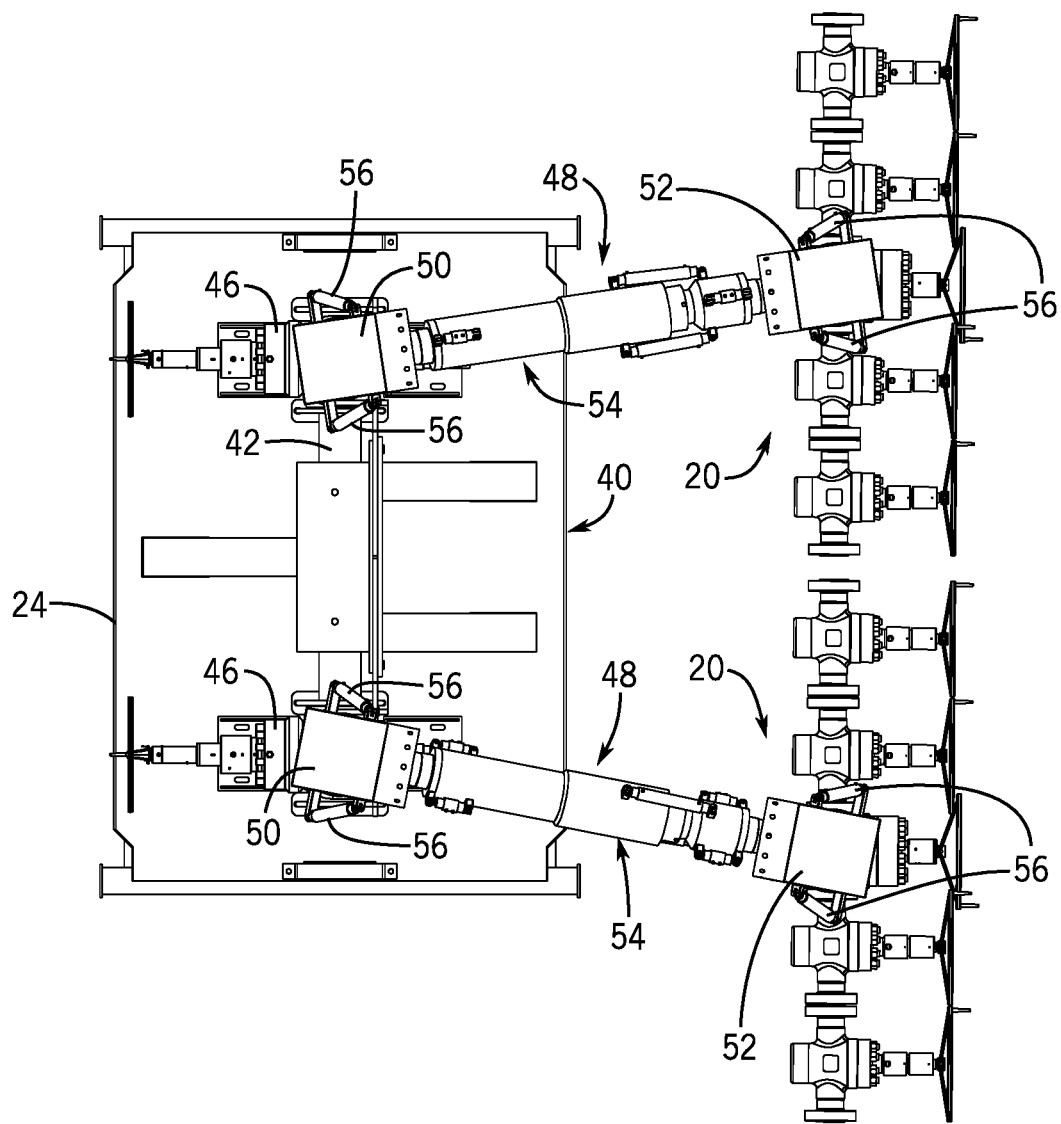
FIG. 4 is a top plan view of the components of the adjustable fracturing system depicted in FIG. 3.

In at least some embodiments, fluid conduits with swivel or other pivot connections are coupled between the fracturing manifold 22 and fracturing trees 20 to facilitate assembly of a fracturing fluid delivery system. One such example is generally depicted in FIGS. 3 and 4 as having a skid-mounted assembly 40 of the fracturing manifold 22 coupled to a pair of fracturing trees 20 by fluid connectors 48. The assembly 40 includes a pipe 42 spanning connection blocks 44. The pipe 42 and the connection blocks 44 are part of a trunk line of the manifold 22 for routing fracturing fluid to be delivered to multiple fracturing trees, and it will be appreciated that other pipes or conduits can be coupled to the connection blocks 44 to join other portions of the trunk line (e.g., to other skid-mounted assemblies 40).

Valves 46 enable individual control of the flow of fracturing fluid from the trunk line to each fracturing tree 20 through the fluid connectors 48. The valves 46 are depicted here as mounted on the skid 24 as part of the assembly 40 of the fracturing manifold 22. In other instances, valves 46 could be positioned elsewhere (e.g., at the other end of the fluid connectors 48) or omitted (e.g., valves of the fracturing trees could be used to control flow of fracturing fluid from the manifold into the wells).

The fluid connectors 48 include connection blocks 50 and 52 joined by fluid conduits 54. In the presently depicted embodiment, the connection blocks 50 are coupled to valves 46 at the fracturing manifold side of the fluid conduits 54 and may thus be referred to as fracturing manifold connection blocks 50. The connection blocks 52 are coupled to the fracturing trees 20 and may be referred to as fracturing tree connection blocks 52. As shown in FIG. 3, the connection blocks 50 and 52 are elbow blocks mounted over the valves 46 and the trees 20, though other arrangements are possible.

The connection blocks 50 and 52 in at least some embodiments are connected to the fracturing manifold 22 and to the fracturing trees 20 in a manner that allows these blocks 50 and 52 to swivel about their vertical axes, as described further below. In some instances, the blocks 50 and 52 can swivel a full 360° about their vertical axes to allow these blocks to point in any desired direction in a horizontal plane. Pairs of the blocks 50 and 52 can be turned to face one another and facilitate connection of the fracturing manifold 22 with the fracturing trees 20 via the fluid connectors 48. Hydraulic cylinders 56 can be used to rotate the blocks 50 and 52 about their vertical axes, though the blocks could be rotated in other ways, such as manually.

The fluid conduits 54 are joined to the blocks 50 and 52 with additional swivel connections to further facilitate connection of the fluid connectors 48 between the fracturing manifold 22 and the fracturing trees 20. In at least some instances, the connection blocks 50 and 52 are turned toward one another, such as shown in FIG. 4, during installation to accommodate lateral spacing variations between the connection points for the fluid connectors 48 (i.e., at the fracturing manifold 22 and at the fracturing trees 20). The fluid conduits 54 can also be rotated in their vertical planes via their swivel connections with the connection blocks to accommodate height differences between the connection points.

In at least some embodiments, the fluid connectors 48 provide line-of-sight fluid connections between the fracturing manifold 22 and the fracturing trees 20. For example, each of the fluid connectors 48 depicted in FIG. 3 has a straight, rigid conduit 54 that extends linearly from its fracturing manifold connection block 50 to its fracturing tree connection block 52. As noted above, the conduit 54 may be joined to the connection blocks 50 and 52 with swivel connections. The conduit 54 in this example is a straight, line-of-sight fluid connection that spans the distance from the manifold assembly 40 to a fracturing tree 20.

Additional details of the conduit 54 may be better understood with reference to FIGS. 5 and 6. These figures show the conduit 54 as having a linearly adjustable design including an inner body 62 received within an outer body 64. A collar 66 may also be threaded into the outer body 64 so as to be positioned concentrically between the inner body 62 and outer body 64.

The depicted conduit 54 also includes ball joint pipes 68 at opposite ends of the adjustable body. These pipes 68 include ball elements that may be received within the connection blocks 50 and 52 to provide the swivel connections (e.g., ball joints) between the conduit 54 and the connection blocks 50 and 52, as described above. The conduit 54 includes connection assemblies that allow quick connections of the ball joint pipes 68 to the linearly adjustable body (i.e., to one end of the inner body 62 and to the opposite end of the outer body 64) with hydraulic cylinders 70.

Figure 7:
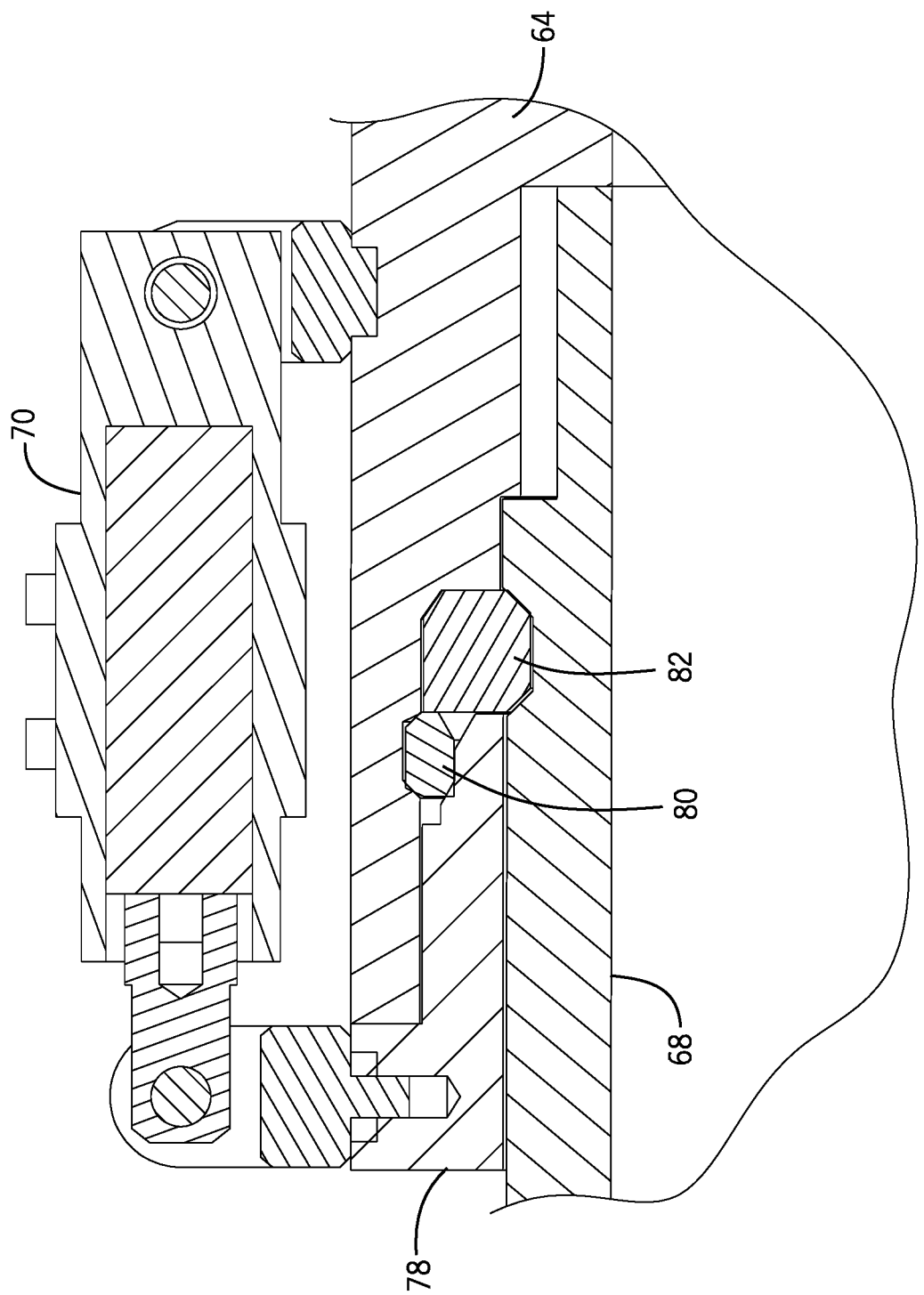
FIGS. 7 and 8 are detail views of a hydraulic quick-connect assembly for locking a ball joint pipe to the rest of the fluid conduit of FIGS. 5 and 6 in accordance with one embodiment.
Figure 8:
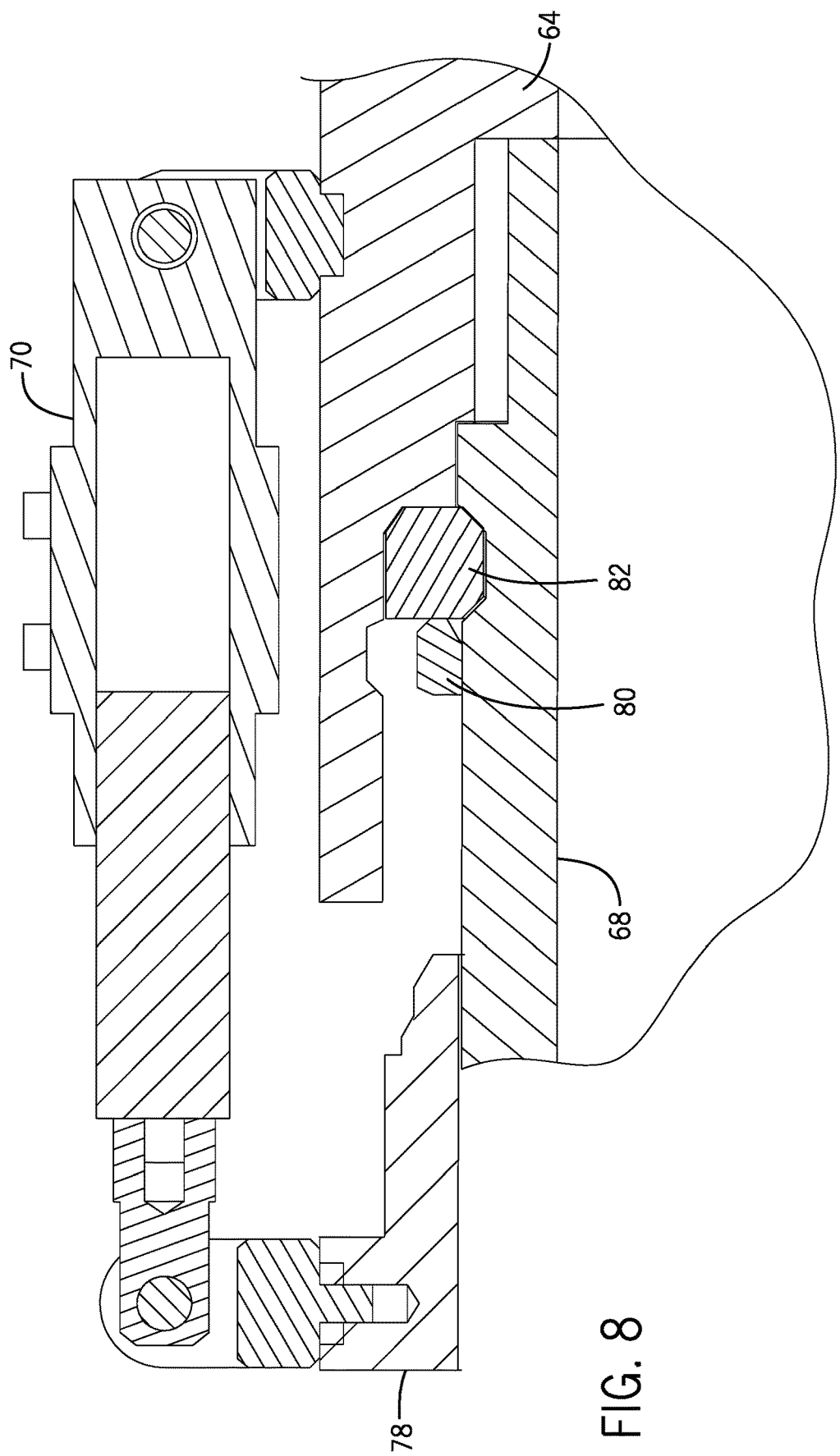

More specifically, as shown in FIGS. 6-8, connection assemblies for locking the ball joint pipes 68 to the linearly adjustable body include energizing rings 78, snap rings 80, and split rings 82. The hydraulic cylinders 70 control the position of the energizing rings 78 with respect to the snap rings 80. When one of the connection assemblies is in the unlocked position, as generally depicted in FIG. 8, the hydraulic cylinders 70 of that assembly are extended so that the energizing ring 78 and the snap ring 80 are separated. The ball joint pipe 68 can then be locked to the adjustable body (e.g., to the inner body 62 or the outer body 64) by retracting the cylinders 70 and moving the energizing ring 78 along the pipe 68 to engage the snap ring 80, such as shown in FIG. 7. The energizing ring 78 drives the snap ring 80 radially outward into its locked position in a landing groove of the adjustable body. In this locked position, the snap ring 80 inhibits movement of the ball joint pipe 68 relative to the adjustable body. In the depicted embodiment, the snap ring 80 is inwardly biased and moving the energizing ring 78 to the position shown in FIG. 7 causes the snap ring 80 to contract about the ball joint pipe 68 and exit the landing groove of the adjustable body.

Figure 9:
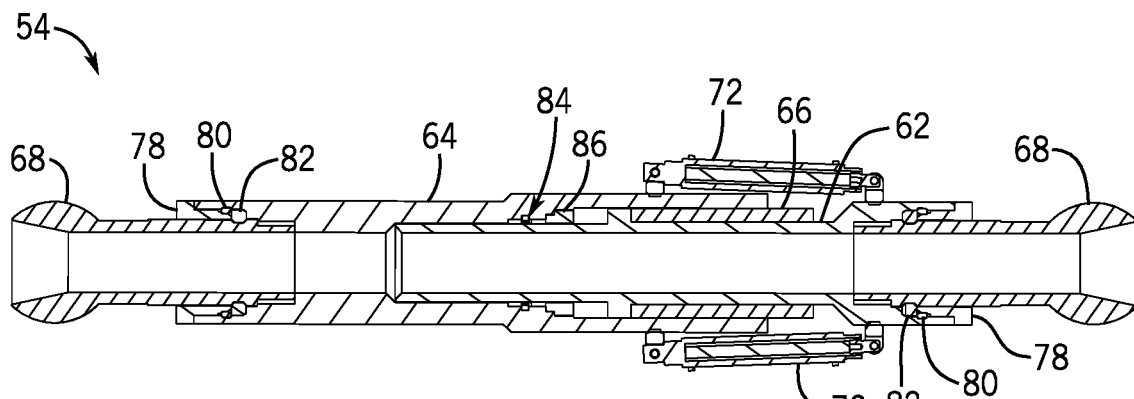
FIG. 9 is a horizontal cross-section of the fluid conduit of FIGS. 5 and 6.

Hydraulic cylinders 72, such as shown in FIGS. 5 and 9, can be operated to lengthen or shorten the adjustable conduit body by adjusting the amount by which the inner body 62 extends from the outer body 64. The linearly adjustable conduit body can be constructed to allow for any desired amount of variation in length. Some conduit bodies may allow an adjustment range of twelve inches or eighteen inches, for instance. Wiper seals 84 inhibit leakage from the conduit between the inner body 62 and the outer body 64. The wiper seals 84 can be retained within the outer body 64 with a packing gland 86 threaded into the outer body 64, as generally depicted in FIGS. 6 and 9, or in any other suitable manner.

Figure 10:
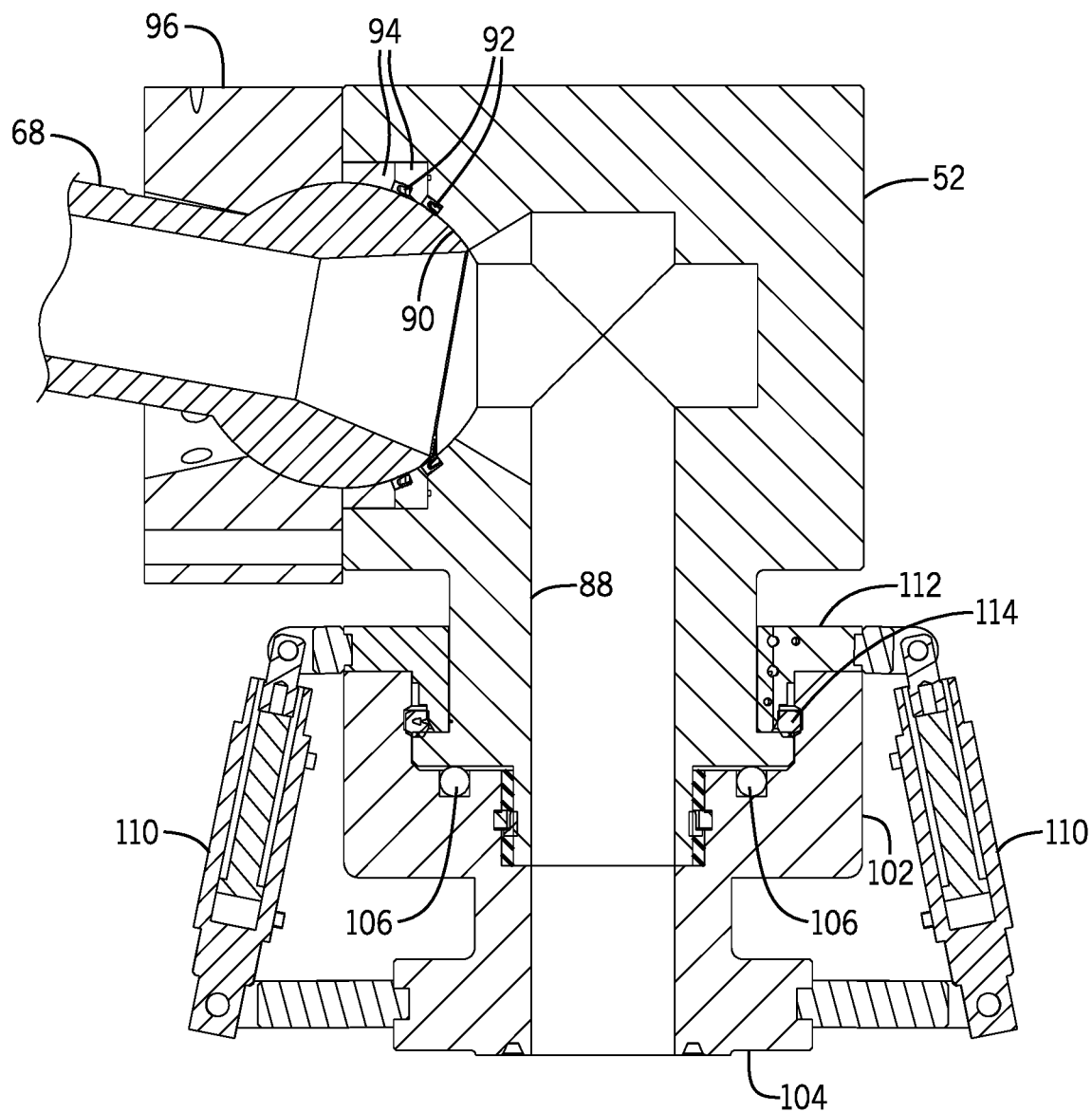
FIG. 10 depicts a ball element of the conduit of FIGS. 5 and 6 received within a socket of a connection block to form a ball-and-socket joint that facilitates coupling of the fluid connector to the fracturing manifold and a fracturing tree in accordance with one embodiment.

As noted above, the rounded ends of the ball joint pipes 68 can be received in the connection blocks 50 and 52 to facilitate connection of the fluid connector 48 across the manifold 22 and a tree 20. As depicted in FIG. 10, the ball joint pipe 68 is coupled to the connection block 52 with a ball-and-socket joint. More particularly, a ball element of the ball joint pipe 68 is received in a socket 90 of the connection block 52 and allows fluid communication between the bore of the conduit 54 and a bore 88 of the connection block 52.

Seals 92 (e.g., thermoplastic, metal, or elastomeric seals) inhibit fluid leakage at the connection and are retained within the socket 90 by retaining rings 94. A retaining ring 96 coupled to the connection block 52 retains the ball element within the socket 90. The ball element of the ball joint pipe 68 at the opposite end of the conduit 54 can be coupled to the connection block 50 in a similar or identical manner to that shown and described with respect to FIG. 10.

The ball element can be rotated within the socket 90, which allows variation of the angular position of the ball joint pipe 68 (and the conduit 54 as a whole) with respect to the connection block 52. For example, the end of the conduit 54 opposite the ball joint pipe 68 shown in FIG. 10 can be raised or lowered to change the angle in the vertical plane between the axis of the ball joint pipe 68 and the vertical axis of the connection block 52. The connection block 50 can be coupled to the conduit 54 in a similar or identical ball-and-socket arrangement. In other instances, the conduit 54 can be connected to the connection blocks 50 and 52 with some other form of pivot joints. Whether provided as ball-and-socket connections or in some other form, these pivot joints accommodate elevational differences between the connection blocks 50 and 52 when connected at the fracturing manifold 22 and the fracturing tree 20. In some instances, a ball element in a socket 90 can be locked into place after it is positioned in a desired manner. For example, in some embodiments the connection of the retaining ring 96 to the connection block 50 or 52 is tightened (e.g., by passing fasteners through the retaining ring 96 and threading these fasteners into mating holes in the connection block) after positioning the ball element to preload the retaining ring against the ball element. In such cases, contact pressure on the ball element inhibits further movement within the socket 90. Other embodiments use one or more set screws extending through the retaining ring 96 that can be tightened to contact the ball element and inhibit further movement of the ball element in the socket 90.

As noted above, the connection blocks 50 and 52 can also be rotated to face one another and facilitate coupling of a fluid connector 48 across the fracturing manifold 22 and a fracturing tree 20. In the embodiment generally illustrated in FIG. 10, the connection block 52 is coupled to an adapter spool 102, which can be coupled to another component of a fracturing tree 20 (as shown in FIG. 2). The depicted adapter spool 102 includes a lower flange 104 to facilitate connection to the rest of the fracturing tree 20, but in other embodiments the flange could be omitted (e.g., the lower end of the spool 102 could have threaded holes for receiving fastening bolts). In at least some embodiments, the connection between the connection block 52 and the adapter spool 102 is a swivel joint that includes one or more bearings 106. The bearings 106 can take any suitable form, such as the ball bearings shown in a groove of the adapter spool 102 in FIG. 10. The connection block 52 can be rotated on the bearings 106 to align the front face of the connection block 52 (i.e., the face having the socket 90) with that of the connection block 50. The connection block 50 can include a similar or identical adapter spool 102 that joins the connection block 50 to another component of the fracturing manifold 22 (e.g., to a valve 46) and allows the connection block 50 to also be rotated to face the connection block 52.

Further, in at least some embodiments, such as those with the ball-and-socket arrangement shown in FIG. 10, the conduit 54 could also be moved laterally to change the angle in the horizontal plane between the axis of ball joint pipe 68 and a horizontal axis of the connection block 52 (or of the connection block 50 at the opposite ball joint pipe 68)

extending through the retaining ring 96. In these embodiments, a pair of connection blocks 50 and 52 of a given fluid connector 48 could be rotated to generally face one another, while the conduit 54 could be rotated laterally with respect to the connection blocks for finer adjustment to accommodate some amount of angular misalignment between the connection blocks.

The connection blocks 50 and 52 can be coupled to the adapter spools 102 in any suitable manner. For instance, as generally shown in FIG. 10, each of these connection blocks 50 and 52 can be locked to the adapter spools 102 with a quick-connect assembly including hydraulic cylinders 110, an energizing ring 112, and a snap ring 114. Like the quick-connect assemblies for locking the ball joint pipes 68 to the linearly adjustable body of the fluid conduit 54, the cylinders 110 can be retracted to draw the energizing ring 112 down along the body of the connection block 52 and into engagement with the snap ring 114, which is driven radially outward into a locking groove in the adapter spool 102. In this locked position, the snap ring 114 retains a flanged end of the connection block 52 within the spool 102. During disassembly, the cylinders 110 can be extended to move the energizing ring 112 out of engagement with the snap ring 114, which allows the snap ring 114 to exit the locking groove and the connection block 52 to be lifted out of the adapter spool 102.

When connecting the fracturing manifold 22 to a fracturing tree 20 with a fluid connector 48, the components of the fluid connector 48 can be assembled in any suitable order. In some embodiments, the connection block 50 is attached to the fracturing manifold 22 and the connection block 52 is attached to the fracturing tree 20 before joining the connection blocks 50 and 52 with the conduit 54. The ball joint pipes 68 could be coupled to the connection blocks 50 and 52 (e.g., via the pivot connections described above) before or after the connection blocks 50 and 52 are attached to the fracturing manifold 22 and the fracturing tree 20. In certain instances, the two ball joint pipes 68 of the conduit 54 are individually coupled to the connection blocks 50 and 52 and the adjustable-length portion of the conduit having the inner body 62 and the outer body 64 is then connected to each of the ball joint pipes 68. For example, once the ball joint pipes 68 are connected to the connection blocks 50 and 52, the adjustable-length portion of the conduit 54 can be connected to one of the ball joint pipes 68 (e.g., via the quick-connect assembly described above), the inner body 62 and the outer body 64 may then be moved with respect to one another to lengthen this portion of the conduit 54 and receive the second ball joint pipe 68 within the inner or outer body, and this second ball joint pipe 68 can then be locked to the rest of the conduit 54 (e.g., with another quick-connect assembly, as described above).

In another embodiment, the ball joint pipes 68 are connected with the inner and outer bodies 62 and 64 before connecting the conduit 54 to one or both of the connection blocks 50 and 52. For example, the full conduit 54 can be coupled with one of the ball joint pipes 68 to one of the connection blocks 50 or 52 previously mounted on the fracturing manifold 22 or the fracturing tree 20, and then lengthened so as to extend a ball element of the other ball joint pipe 68 into the socket 90 of the other one of the mounted connection blocks 50 or 52. The retaining rings 96 for the ball elements can be carried on the conduit 54 (e.g., on the ball joint pipes 68) before the ball elements of the pipes 68 are positioned in the sockets 90 of the connection blocks. Once a ball element of a pipe 68 is inserted into a socket 90, its retaining ring 96 can be moved against and fastened to the connection block in which the ball element was received.

In still another embodiment, the connection blocks 50 and 52 are joined to the conduit 54 before they are attached to the fracturing manifold 22 and the fracturing tree 20. In such instances, one of the connection blocks 50 or 52 can be attached to the fracturing manifold 22 or the fracturing tree 20, the length of the conduit 54 can be adjusted by a desired amount to span the proper distance across the fracturing manifold 22 and the fracturing tree 20, and the other of the connection blocks 50 and 52 can then be attached to the fracturing manifold 22 or the fracturing tree 20.

Figure 11:
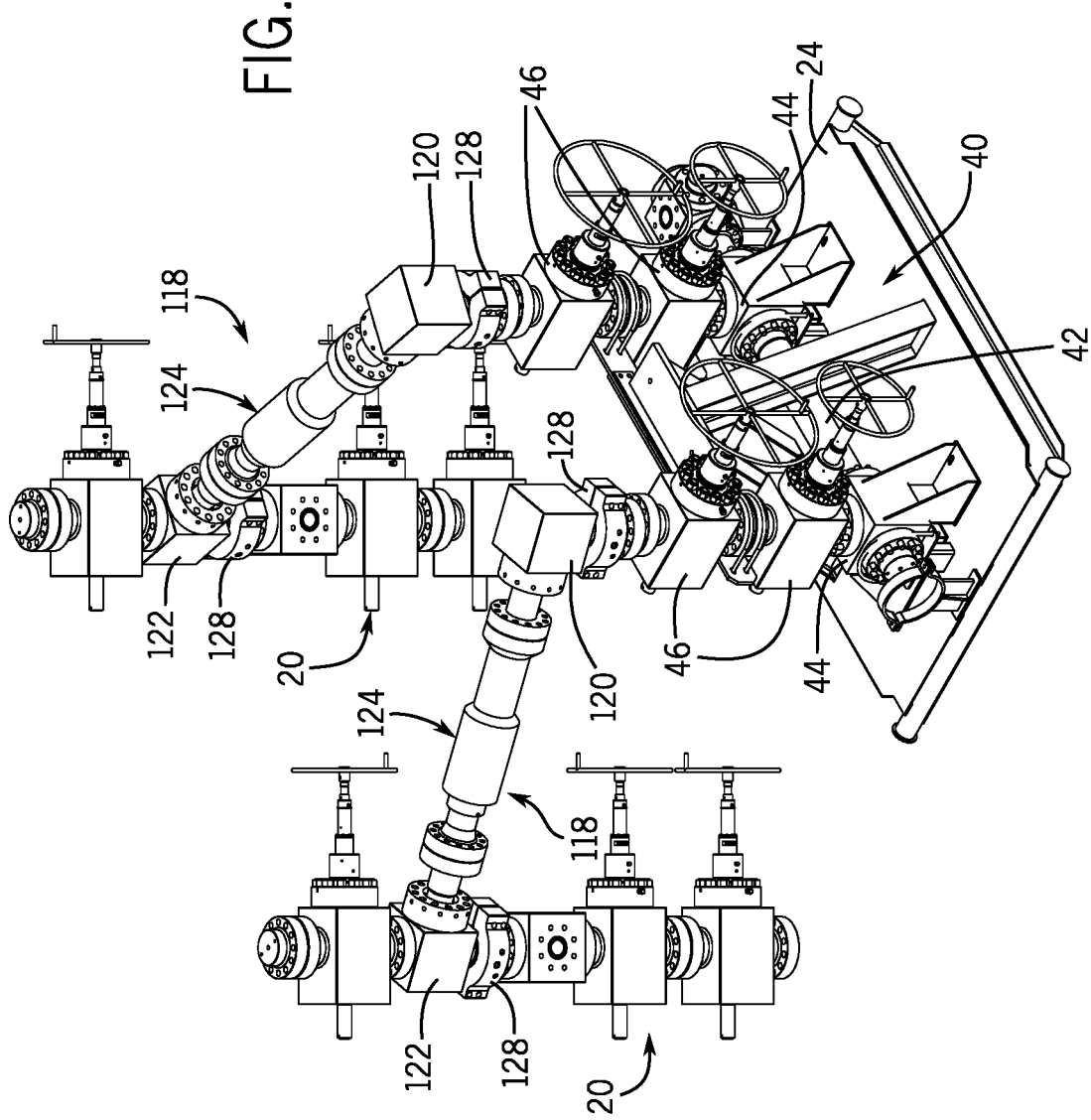
FIG. 11 is a perspective view of certain components of another adjustable fracturing system, including a portion of the fracturing manifold mounted on a skid and joined to fracturing trees with other adjustable fluid connectors, in accordance with one embodiment.
Figure 12:
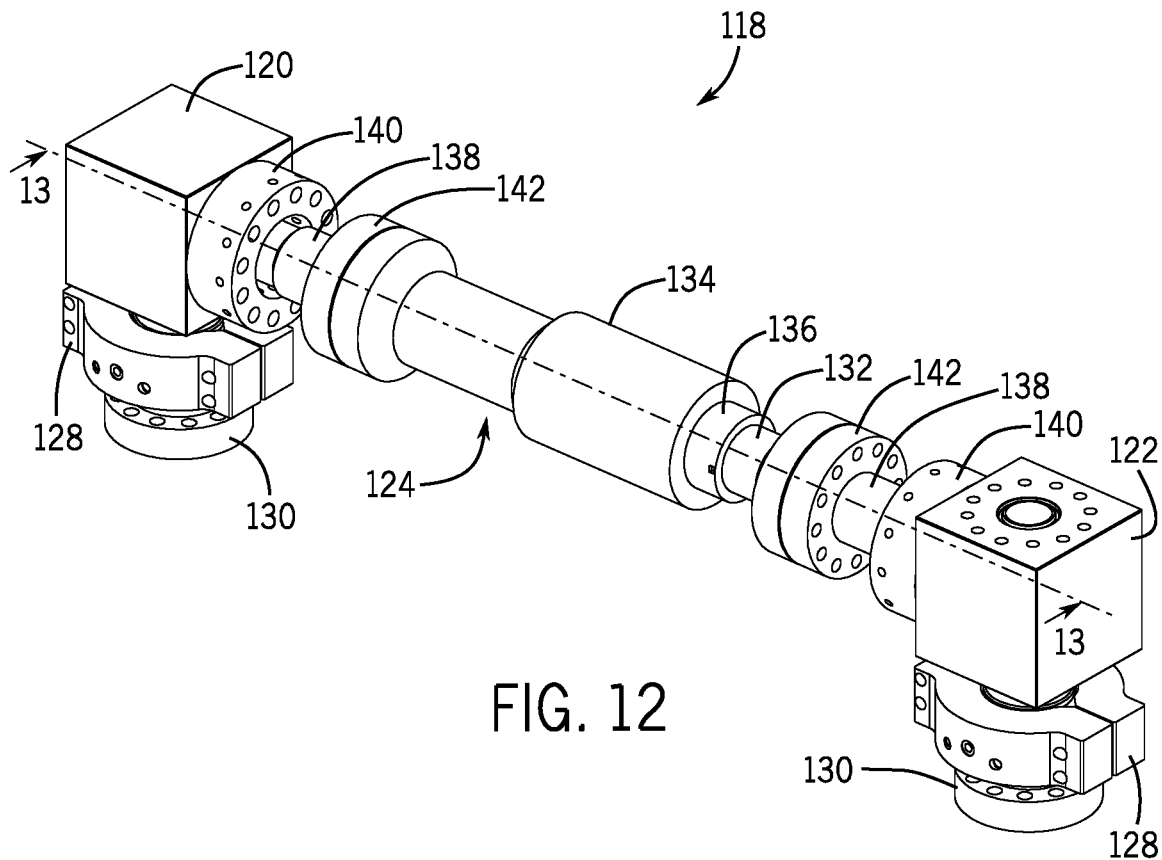
FIGS. 12 and 13 are a perspective view and a vertical cross-section of the line-of-sight fluid connector of FIG. 11 in accordance with one embodiment.
Figure 13:
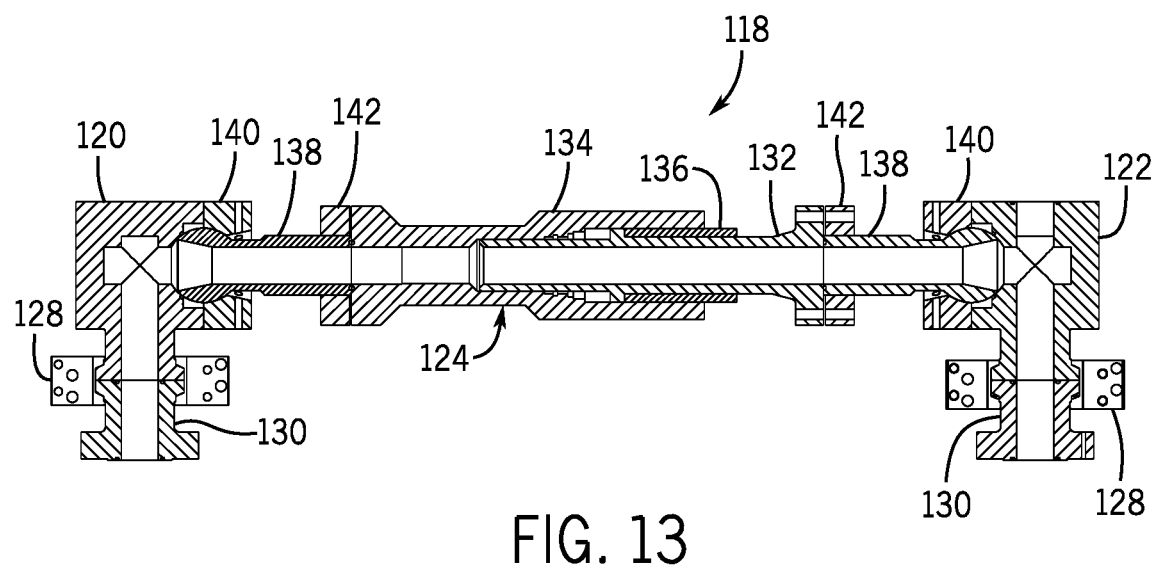

Although certain locking assemblies with energizing rings are described above for quickly connecting the ball joint pipes 68 to the inner and outer bodies 62 and 64 of the conduit 54, and for joining the connection blocks 50 and 52 to the fracturing manifold 22 and the fracturing tree 20 (e.g., via adapter spools 102), in other embodiments these components can be joined in other ways. For example, as depicted in FIGS. 11-13, fluid connectors 118 without such energizing rings can be used to route fracturing fluid from the fracturing manifold 22 to the fracturing trees 20. These fluid connectors 118 include fracturing manifold connection blocks 120, fracturing tree connection blocks 122, and rigid, linearly adjustable fluid conduits 124. These components are similar to the connection blocks 50 and 52 and conduits 54 discussed above, but the connection blocks 120 and 122 are coupled to the fracturing manifold 22 and to the fracturing trees 20 with clamps 128, rather than with a locking assembly having an energizing ring 112 and snap ring 114. The clamps 128 can be positioned about lower flanges of the connection blocks 120 and 122 and mating upper flanges of adapter spools 130 and then tightened to secure the connection blocks to the adapter spools. The adapter spools 130 can be joined to other components of the fracturing manifold 22 and the fracturing trees 20, as shown in FIG. 11.

The conduit 124 has a linearly adjustable length and includes an inner mandrel or body 132 received within an outer body 134. A collar 136 is threaded into the outer body 134 to retain a flange of the inner body 132, and the body of the conduit 124 can be lengthened or shortened by moving the inner body 132 with respect to the outer body 134. Ball joint pipes 138 can be coupled to the inner and outer bodies 132 and 134 as opposite ends of the conduit 124, and ball elements of these pipes 138 can be received in sockets of the connection blocks 120 and 122 and retained by retaining rings 140 in manner like that described above with respect to FIG. 10.

But rather than coupling these ball joint pipes 138 to the inner and outer bodies 132 and 134 with quick-connect locking assemblies having energizing rings and snap rings, in the embodiment depicted in FIGS. 11-13 the ball joint pipes 138 include flanges 142 for connecting to mating flanges of the inner and outer bodies 132 and 134. As shown in FIG. 13, the flanges 142 are threaded onto the ball joint pipes 138 while the mating flanges of the inner and outer bodies 132 and 134 are integrally formed as part of the bodies. Having removable threaded flanges 142 allows retaining rings 140 to be positioned onto the ball joint pipes 138 when the threaded flanges 142 are disconnected. In other instances, however, the flanges 142 are formed integrally with the ball joint pipes 138 (in which case retaining rings 140 could be provided as split rings to allow the rings 140 to be positioned about the ball joint pipes 138 without interference from the flanges 142), or the mating flanges could be removable flanges threaded onto the inner and outer bodies 132 and 134. Although not shown in FIG. 13, it will be appreciated that the fluid connector 118 can include various seals or other components (e.g., seals 84 and 90, packing gland 86, and seal retaining rings 94) like those described above for fluid connector 48. Further, like the fluid connectors 48, the components of the fluid connectors 118 can be coupled to one another and to the fracturing trees 20 and the fracturing manifold 22 in any suitable order.

The fracturing fluid delivery systems described above can be constructed for various operating pressures and with different bore sizes depending on the intended application. In some embodiments, the fluid connectors 48 and 118 are constructed for rated maximum operating pressures of 10-15 ksi (approximately 69-103 MPa). Further, the conduits 54 and 124 of some embodiments have bores between four and eight inches (appr. 10 and 20 cm) in diameter, such as a five-and-one-eighth-inch (appr. 13 cm) diameter or a seven-inch (appr. 18 cm) diameter.

Additionally, while certain embodiments of fluid connectors for routing fluid from a fracturing manifold to a fracturing tree are described above, it will be appreciated that such fluid connectors could take other forms. For example, while the connection blocks 50, 52, 120, and 122 are described as having pivot connections with the rigid, linearly adjustable fluid conduits 54 and 124, in other instances the fluid conduits could have fixed, non-pivoting connections at one or both of the fracturing manifold 22 and the fracturing trees 20. The rigid conduits in such instances could be extended and retracted to span the distance between the connection points at the manifold and at the trees, as described above.

In other cases, multiple ball joint pipes could be connected in series with multiple pivot connections at one or both ends of the fluid conduit 54 or 124 to accommodate angular misalignments greater than that which could be accommodated by a single ball joint pipe and pivot connection. For instance, the ball element of a first ball joint pipe 68 could be received in a socket of a connection block that is attached to an additional ball joint pipe 68, rather than to a fracturing tree or fracturing manifold. A ball element of this additional ball joint pipe 68 could be received instead in the socket 90 of the connection block 50 or 52.

Still further, the rigid, linearly adjustable conduits described above could also be used to convey fluid between other components. For example, one system could include an intermediate fracturing manifold that receives fracturing fluid from the fracturing manifold 22 and distributes the fracturing fluid to multiple fracturing trees 20. Linearly adjustable fluid conduits 54 or 124 could be used to connect the two fracturing manifolds together or could be used to connect the intermediate fracturing manifold to the fracturing trees 20.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A fracturing system comprising:
a first wellhead assembly mounted over a first well;
a second wellhead assembly mounted over a second well;
a fracturing manifold trunk line;
a first vertical branch in fluid communication with and extending upward from the fracturing manifold trunk line;
a second vertical branch in fluid communication with and extending upward from the fracturing manifold trunk line;
a first fluid conduit coupling the first vertical branch in fluid communication with the first wellhead assembly such that the first fluid conduit provides the only fluid path from the first vertical branch to the first wellhead assembly during fracturing; and
a second fluid conduit coupling the second vertical branch in fluid communication with the second wellhead assembly such that the second fluid conduit provides the only fluid path from the second vertical branch to the second wellhead assembly during fracturing;
wherein the first fluid conduit extends linearly from the first vertical branch to the first wellhead assembly and the second fluid conduit extends linearly from the second vertical branch to the second wellhead assembly.

2. The fracturing system of claim 1, wherein the first vertical branch includes an outlet port facing an inlet port of the first wellhead assembly, the second vertical branch includes an outlet port facing an inlet port of the second wellhead assembly, the first fluid conduit extends linearly from the outlet port of the first vertical branch to the inlet port of the first wellhead assembly, and the second fluid conduit extends linearly from the outlet port of the second vertical branch to the inlet port of the second wellhead assembly.

3. The fracturing system of claim 2, wherein the first vertical branch includes a valve to control flow of fracturing fluid through the first vertical branch from the fracturing manifold trunk line to the outlet port of the first vertical branch and the second vertical branch includes a valve to control flow of fracturing fluid through the second vertical branch from the fracturing manifold trunk line to the outlet port of the second vertical branch.

4. The fracturing system of claim 2, wherein the first vertical branch includes multiple valves to control flow of fracturing fluid through the first vertical branch from the fracturing manifold trunk line to the outlet port of the first vertical branch and the second vertical branch includes multiple valves to control flow of fracturing fluid through the second vertical branch from the fracturing manifold trunk line to the outlet port of the second vertical branch.

5. The fracturing system of claim 2, wherein the first vertical branch includes a first connection block having the outlet port of the first vertical branch and the second vertical branch includes a second connection block having the outlet port of the second vertical branch.

6. The fracturing system of claim 5, wherein the first wellhead assembly includes a first additional connection block that receives fracturing fluid routed out of the first vertical branch and through the first fluid conduit, and the second wellhead assembly includes a second additional connection block that receives fracturing fluid routed out of the second vertical branch and through the second fluid conduit.

7. The fracturing system of claim 6, wherein the first connection block of the first vertical branch and the first additional connection block of the first wellhead assembly are at different elevations.

8. The fracturing system of claim 1, wherein the first wellhead assembly includes a fracturing tree.

9. The fracturing system of claim 1, wherein the second wellhead assembly includes a fracturing tree.

10. The fracturing system of claim 1, wherein the first fluid conduit is an adjustable fluid conduit.

11. The fracturing system of claim 1, wherein the second fluid conduit is an adjustable fluid conduit.

12. The fracturing system of claim 1, wherein the first fluid conduit is coupled to the first vertical branch or to the first wellhead assembly via a pivot joint, or the second fluid conduit is coupled to the second vertical branch or to the second wellhead assembly via the pivot joint.

13. The fracturing system of claim 1, comprising a fracturing fluid supply coupled to provide fracturing fluid to the fracturing manifold trunk line.

14. A fracturing system comprising:
a first wellhead assembly mounted over a first well;
a second wellhead assembly mounted over a second well;
a fracturing manifold having a trunk line;
a first fluid path coupling the trunk line to the first wellhead assembly so as to provide fracturing fluid from the trunk line to the first well; and
a second fluid path coupling the trunk line to the second wellhead assembly so as to provide fracturing fluid from the trunk line to the second well;
wherein the first fluid path includes an upright leg and a lateral leg that are coplanar, the upright leg of the first fluid path extends upward from the trunk line and is arranged to receive fracturing fluid flowing upward out of the trunk line, and the lateral leg of the first fluid path extends linearly between the upright leg of the first fluid path and the first wellhead assembly; and
wherein the second fluid path also includes an upright leg and a lateral leg that are coplanar, the upright leg of the second fluid path extends upward from the trunk line and is arranged to receive fracturing fluid flowing upward out of the trunk line, and the lateral leg of the second fluid path extends linearly between the upright leg of the second fluid path and the second wellhead assembly.

15. The fracturing system of claim 14, wherein the first wellhead assembly includes a valve.

16. The fracturing system of claim 14, comprising:
a first elbow with a bore joining the upright leg of the first fluid path and the lateral leg of the first fluid path; and
a second elbow with a bore joining the upright leg of the second fluid path and the lateral leg of the second fluid path.

17. The fracturing system of claim 14, comprising a linearly adjustable conduit through which the first fluid path or the second fluid path passes.

18. A method comprising:
coupling a fracturing manifold trunk line to a first wellhead assembly mounted over a first well, wherein coupling the fracturing manifold trunk line to the first wellhead assembly includes coupling a first fluid conduit between the first wellhead assembly and a first vertical branch connected to the fracturing manifold trunk line to provide a linear flow path from the first vertical branch to the first wellhead assembly, the first vertical branch provides a rising flow path from the fracturing manifold trunk line, and the rising flow path provided by the first vertical branch and the linear flow path provided by the first fluid conduit from the first vertical branch to the first wellhead assembly are coplanar; and
coupling the fracturing manifold trunk line to a second wellhead assembly mounted over a second well, wherein coupling the fracturing manifold trunk line to the second wellhead assembly includes coupling a second fluid conduit between the second wellhead assembly and a second vertical branch connected to the fracturing manifold trunk line to provide a linear flow path from the second vertical branch to the second wellhead assembly, the second vertical branch provides an additional rising flow path from the fracturing manifold trunk line, and the additional rising flow path provided by the second vertical branch and the linear flow path provided by the second fluid conduit from the second vertical branch to the second wellhead assembly are coplanar.

19. The method of claim 18, wherein coupling the first fluid conduit between the first wellhead assembly and the first vertical branch includes coupling the first fluid conduit to the first vertical branch via a first connection block, and coupling the second fluid conduit between the second wellhead assembly and the second vertical branch includes coupling the second fluid conduit to the second vertical branch via a second connection block.

20. The method of claim 18, comprising providing at least one valve in each of the first vertical branch and the second vertical branch.

* * * * *